United States Patent
Kensy et al.

(10) Patent No.: US 9,619,978 B2
(45) Date of Patent: Apr. 11, 2017

(54) OPERATING STATUS WARNING LAMP APPARATUS

(71) Applicant: WERMA Holding GmbH + Co. KG, Rietheim-Weilheim (DE)

(72) Inventors: Daniel Kensy, Tuttlingen (DE); Christian Hoehler, Wellendingen (DE)

(73) Assignee: WERMA Holding GmbH + Co. KG, Rietheim-Weilheim (DE)

( * ) Notice: Subject to any disclaimer, the term of this patent is extended or adjusted under 35 U.S.C. 154(b) by 0 days.

(21) Appl. No.: 14/151,799

(22) Filed: Jan. 9, 2014

(65) Prior Publication Data

US 2014/0197961 A1  Jul. 17, 2014

(30) Foreign Application Priority Data

Jan. 11, 2013 (DE) .................. 10 2013 000 336

(51) Int. Cl.
*G09F 9/33* (2006.01)
*G08B 5/36* (2006.01)
(Continued)

(52) U.S. Cl.
CPC .................. *G08B 5/36* (2013.01); *F21V 3/02* (2013.01); *G02B 6/001* (2013.01); *G02B 6/0051* (2013.01); *G09F 9/33* (2013.01)

(58) Field of Classification Search
CPC .... G02B 6/0018; G02B 6/002; G02B 6/0021; G02B 6/0036; G02B 6/0038;
(Continued)

(56) References Cited

U.S. PATENT DOCUMENTS 7,806,539 B2* 10/2010 Parker et al. .................. 362/19
2003/0007344 A1* 1/2003 Parker .................. A61M 21/02
362/615
(Continued)

FOREIGN PATENT DOCUMENTS

DE 20 2007 005 495 U1 10/2007
DE 20 2011 005 624 U1 9/2011
WO WO 01/84046 A1 11/2001

*Primary Examiner* — Steven Lim
*Assistant Examiner* — Mancil Littlejohn, Jr.
(74) *Attorney, Agent, or Firm* — Breneman & Georges (57) ABSTRACT

An operating status warning lamp apparatus for visually indicating at least one operating status or a plurality of different operating statuses for a technical appliance such as a machine, an installation, a vehicle or the like having at least one warning lamp unit (1, 4), wherein the warning lamp unit (1, 4) has at least one warning lamp element (3) for producing warning light (6), wherein the warning lamp unit (1, 4) has a radiating element (1), having at least one warning lamp radiating area (4), for radiating the warning light (6), wherein the radiating element (1) has at least one end face (2) oriented transversely with respect to the warning lamp radiating area (4), is proposed that can be produced without great design involvement, at reasonable cost and using new layout options. The invention achieves this in that the warning lamp element (3) is arranged on the end face (2) for the purpose of coupling the warning light (6) into the radiating element (1) and in that the radiating element (1) has scattering means (5, 12, 15) for scattering the warning light (6), as result of which the warning light (6) enters the radiating element (1) via the end face (2) and can be deflected to the warning lamp radiating area (4).

18 Claims, 3 Drawing Sheets

(51) Int. Cl.
*F21V 3/02* (2006.01)
*F21V 8/00* (2006.01)

(58) Field of Classification Search
CPC .. G02B 6/0061; G02B 6/0068; G02B 6/0051;
G02B 6/001; G02B 6/0011; G02B
6/0013; G02B 6/0015; G02B 6/0016;
G02B 6/0023; G02B 6/0025; G02B
6/0026; G02B 6/0035; G02B 6/0041;
G02B 6/0043; F21V 5/00; G08B 5/36
USPC .............. 340/815.42, 815.5, 815.73, 815.45;
362/618, 23.16, 235, 297, 308, 31, 609
See application file for complete search history.

(56) References Cited

U.S. PATENT DOCUMENTS

| | | | |
|---|---|---|---|
| 2005/0159497 A1* | 7/2005 | Gauthier | B01J 13/0091 521/50 |
| 2005/0272975 A1* | 12/2005 | McWeeney et al. | 600/113 |
| 2008/0285310 A1* | 11/2008 | Aylward | G02B 6/001 362/626 |
| 2010/0157584 A1* | 6/2010 | Ho | F21S 4/00 362/223 |
| 2011/0002035 A1* | 1/2011 | Okamoto | G03B 21/56 359/443 |

* cited by examiner

OPERATING STATUS WARNING LAMP APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON COMPACT DISC, OR AS TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION (1) Field of the Invention

The invention relates to an operating status warning lamp apparatus for visually indicating at least one operating status or a plurality of different operating statuses for a technical appliance such as a machine, an installation, a vehicle or the like according to the preamble of claim 1.

(2) Description of Related Art Including Information Disclosed Under 37 C.F.R. 1.97 and 1.98

Such operating status warning lamp apparatuses or signaling appliances such as signal columns or the like have already been used for years in widely differing variants. In many cases, the classic signal column with three interchangeable removable modules is used, which usually has the color combination of red, yellow and green. Since signal columns are mostly of modular design, it is also entirely possible for additional removable modules in the color blue or white, etc., to be included or for individual removable modules also to be removed again in the case of changing operating conditions. In many cases, audible signal generators such as piezo discs or multitone generators or horns, etc., are also integrated in the appliance, so that not only visual but also audible signaling can take place.

In recent years, the flexibility of corresponding signaling appliances has increased more and more. By way of example, what are known as RGB LEDs have also allowed the use of signal columns that have a standard spherical cap, and in fault-free operation only a portion of the spherical cap lights in the color green, but in the event of a fault the complete spherical cap can light in red.

Precisely the use of RGB LEDs also allows almost all conceivable lamp colors to be produced using an appropriate electronic controller. By way of example, DE 2007 005 495 U1 from the applicant already discloses a warning lamp column with RGB LEDs that is freely configurable. This means that the user can configure one or more lamp parameters for the warning lamps according to the application.

In the case of signaling appliances used hitherto, the spherical caps are in the form of hollow bodies, e.g. in the form of hollow cylinders, inside which, usually centrically, the illuminants, such as LED, light bulb, etc., are arranged. These LEDs or warning lamp elements are the respective warning light source, with the visible light produced by the warning lamp element coming upon the transparent spherical cap through the hollow interior of the spherical cap or of the signal column and being radiated by said spherical cap or by the outer area thereof to the outside, so that relevant persons can see the lighting of the respective module or of the respective lamp color.

However, a disadvantage in this case is that, precisely when using LEDs that have a very narrowly limited direction of radiation, there is a need for, for example, all-round illumination of the hollow cylindrical spherical cap by comparatively elaborate and costly arrangements of numerous LEDs on, usually, a plurality of printed circuit boards that are arranged in tower fashion in relation to one another and longitudinally around the central median/longitudinal axis.

Furthermore, the spherical caps usually have elaborate geometric structures on the inside in order to optimize the radiation of light. Since the spherical caps are habitually produced using molding methods, particularly by means of plastic molding methods, the production of internally arranged, elaborate geometric structures for the spherical caps requires correspondingly elaborate and complex molding tools. The production of corresponding complex spherical caps is accordingly costly.

In addition, signaling appliances with spherical caps that are accordingly in the form of hollow bodies are also limited in terms of design. Recently, however, the aesthetic demands on warning lamp apparatuses or signaling appliances/signal columns have also become more and more challenging in respect of the design or layout thereof too.

BRIEF SUMMARY OF THE INVENTION

By contrast, it is an object of the invention to propose an operating status warning lamp apparatus of the type cited by way of introduction that can be produced without great design involvement, at reasonable cost and using new layout options.

On the basis of an apparatus of the type cited by way of introduction, this object is achieved by the features of claim 1. The measures cited in the subclaims allow advantageous effects and developments of the invention.

Accordingly, an inventive apparatus is distinguished in that the warning lamp element is arranged on the end face for the purpose of coupling the warning light into the radiating element and in that the radiating element has scattering means for scattering the warning light, as result of which the warning light enters the radiating element via the end face and can be deflected to the radiating area.

An end arrangement of this kind for the warning lamp element on the radiating element is used to implement a complete departure from the previous arrangement of the warning lamp element inside or centrally inside the hollow body or the spherical cap or the cavity encased by the warning lamp radiating area.

The advantageous scattering means deflect the light coupled in at the end in advantageous fashion (by approximately 90°), and the at least one warning lamp radiating area decouples it from the radiating element or decouples it from the inventive apparatus.

In accordance with the invention, completely novel design options or layout variants can be implemented.

It also becomes possible for LEDs, for example, to be arranged as warning lamp elements with relatively little design involvement. An arrangement as in the case of the prior art, wherein for example of a plurality of printed circuit board strips that are arranged centrally inside a hollow spherical cap and that radiate over the full perimeter, is dispensable and it is nevertheless possible to produce 360° radiation/decoupling, for example. By way of example, it is thus possible to use the present invention to provide an arrangement of the warning lamp elements having a direction of radiation in and/or contrary to the longitudinal direction or longitudinal axis of the apparatus or of the signaling appliance/signal column, and the advantageous deflection by means of the scattering means can produce lateral decoupling of the warning light, or decoupling of the warning light that is directed transversely with respect to the longitudinal direction or longitudinal axis.

Preferably, the end face is smaller than the warning lamp radiating area. Thus, the space requirement that is needed for the warning lamp elements can be reduced in comparison with the prior art and/or an extensive or elaborate-design arrangement or placement of the warning lamp elements, such as LEDs, according to the prior art can be dispensed with. In addition, a comparatively small end face into which the warning light is coupled can be used to produce a particularly large or even an almost arbitrarily large warning lamp radiating area in accordance with the invention.

Advantageously, a reflector or a reflector layer is arranged on a lateral area of the cover element, preferably on that side of the radiating element that is opposite the warning lamp radiating area. In this embodiment, the warning light is therefore guided from one side of the radiating element through the entire thickness of the radiating element by advantageous reflection and decoupled on the opposite side or on the warning lamp radiating area in accordance with the invention in order to indicate the relevant operating status of the technical appliance in accordance with the invention.

Actually, the input coupling of the warning light through the end face, which is essentially oriented almost perpendicular to the direction of input coupling and/or to the radiating area(s) of the radiating element, at the radiating area(s) results in total reflection of the warning light. However, the advantageous scattering means advantageously deflect the visual warning light such that these radiating areas that are oriented transversely/perpendicular with respect to the end face do not reflect visual warning light back into the radiating element again through total reflection, but rather said warning light can be advantageously decoupled at the radiating area or at this optical transition. This means that the warning light coupled in at a very acute angle or almost parallel to the radiating area is advantageously deflected by the scattering means such that it impinges on the radiating area at an angle that is larger than the angle of the corresponding total reflection and is therefore decoupled in accordance with the invention.

In one advantageous embodiment of the invention, the scattering means are in the form of a diffuser area and/or diffuser layer arranged on the warning lamp radiating area and/or surface of the radiating element. The effect achieved by this is scattering of the warning light and advantageously also that the warning light striking the radiating area of the radiating element at an acute angle is not diffracted by total reflection back into the radiating element at an acute angle but rather can be deflected at a larger or obtuse deflection angle and hence can emerge or decouple through the warning lamp radiating area in accordance with the invention.

By way of example, the diffuser layer and/or a light refraction layer that is arranged on the radiating element is optically thinner or optically denser than the radiating element. This advantageously alters the optical transition or the refraction at the interface between cover element and layer or diffuser layer, so that the warning light decouples in accordance with the invention.

In one particular embodiment, the diffuser area or the diffuser layer may at the same time comprise the warning lamp radiating area. This means that in this case the warning light appearing on the diffuser area or diffuser layer is not reflected back into the radiating element again but rather is diffracted thereon to the outside, so that the diffuser area or diffuser layer and/or the light reflection layer at the same time comprises the warning lamp radiating area.

An advantageous diffuser area and/or diffuser layer can be arranged not only at the surface of the radiating element but also inside the radiating element. It has been found that this also advantageously allows the warning light to be decoupled through the warning lamp radiating area. In addition, further novel layout options arise, particularly with regard to bilateral decoupling of the warning lamp light.

In general, an advantageous diffuser area and/or diffuser layer can be produced by virtue of the radiating element having a cloudiness. By way of example, such cloudiness is produced by means of sandblasting, acid etching or the like. Sandblasting or acid etching of glass or plastic such as Plexiglas is preferably implemented at the surface of the radiating element.

Furthermore, however, it is also possible for cloudiness or production of a diffuser area or diffuser layer to be implemented not only at the surface, that is to say on the outside, but also inside the radiating element by means of advantageous laser methods or the like. By way of example, it is thus possible for laser irradiation of the radiating element to produce a diffuser area at the surface and/or even also inside the radiating element, with material conversion being implemented at points or over a small area, for example, by means of heat treatment, so that the warning light can be deflected at appropriate scattering centers in accordance with the invention and is advantageously decoupled through the warning lamp radiating area.

Furthermore, material-removing methods, i.e. not just using sandblasting or the like, but also machine cutting methods can also produce recesses or cutouts and/or roughened/cloudy areas on the radiating element. The roughened surface generated in this case can deflect the warning light in accordance with the invention and can advantageously decouple it through the warning light radiating area.

In one particular development of the invention, the scattering means are in the form of scattering bodies and/or scattering particles arranged on and/or inside the radiating element. Such scattering bodies or scattering particles can be embedded or distributed when the radiating element is actually produced. By way of example, when a radiating element made of plastic is used, very fine-grained plastic particles and/or particles made of another material having light-refracting or light-scattering properties can be embedded into the transparent plastic matrix.

Preferably, the body diameters or particle diameters are smaller than the wavelength of visible light, so that they result in an advantageous layout and are barely perceptible and/or imperceptible to a human eye inside the radiating element. This allows the realization of a completely transparent layout for the radiating element in the switched-off state, resulting in completely novel layout or design options.

Advantageously during operation of the warning lamp element or when the warning lamp element is lit, the warning light is deflected at the advantageous scattering bodies or scattering particles and advantageously decoupled at the warning lamp radiating area. When colored light is used, this means that the original transparent or see-through radiating element has its color modified by the warning light as appropriate and as a result is perceived in a particular or surprising manner by relevant persons.

In one advantageous embodiment of the invention, the scattering bodies or scattering particles and/or the diffuser areas or diffuser layers are distributed evenly or homogeneously on or in the radiating element. This results in homogeneous decoupling of light in the switched-on operating status.

In an alternative embodiment of the invention, the arrangement or distribution of the scattering bodies or scattering particles and/or the formation of the diffuser area or diffuser layer is partially or only above a portion or a subarea of the radiating element or lateral face of the apparatus in accordance with the invention. Accordingly, there is no homogeneous distribution provided, but rather a distribution that is different inside prescribed, in particular homogeneous, subareas and/or a partial but inherently homogeneous two-dimensional distribution of the scattering means in accordance with this embodiment. By way of example, this allows the advantageous generation of patterns and/or symbols and/or letters or text. Preferably, such patterns or letters or the like first become visible in the switched-on state or advantageously light by virtue of the warning light and are almost invisible or transparent in the switched-off state. This can increase the attention of the relevant persons in an exceptional manner.

Advantageously, the radiating element is formed essentially from solid material. By way of example, the radiating element is in the form of a plate or cylinder. This results in completely novel layout options for an apparatus in accordance with the invention.

Precisely the use of a plate or a flat radiating element preferably in a form of a parallelepiped or a prism, wherein the ends are comparatively small but thin in relation to the individual radiating area, allows the production of a particularly flat apparatus in accordance with the invention. By way of example, it is thus possible to produce an apparatus in accordance with the invention having a thickness of one or two centimeters. The use of correspondingly plate-like apparatuses in accordance with the invention opens up completely novel application options or layout options. By way of example, it is possible for an end with a width of approximately 0.5 cm to 2 cm to be provided and, by way of example, to have one of the two opposite radiating areas of in each case 10 cm×10 cm or 20 cm×15 cm or 10 cm×40 cm, etc., for example. In this context, not only is it possible for appropriately extensive decoupling of the warning light to be implemented on one side of the plate, it is also possible for the decoupling to be implemented on the two opposite plate areas.

In one particular development of the invention, the radiating element is essentially in the form of a cylinder or the form of a hollow cylinder, the height preferably being greater than the external diameter. In the case of such a variant of the invention, the warning lamp elements or the LEDs or the like in accordance with the invention are arranged in the direction of the longitudinal axis or central axis, i.e. on the base/end. Accordingly, these variants have the inventive end in the form of a circle or circular ring on which the warning lamp element(s) are arranged. In this case, the warning lamp radiating area in accordance with the invention is the lateral face of the cylinder or of the hollow cylinder. The effect achieved by this is that a (planar) two-dimensional or just two-dimensionally oriented arrangement of a plurality of warning lamp elements or else only a single warning lamp element on an appropriate end face is entirely capable of producing advantageous all-round radiation in the circumferential direction of the lateral face of the cylinder. This considerably reduces the design involvement for the arrangement and production of all-round radiation in the case of a cylindrical or hollow cylindrical radiating element in comparison with the prior art.

Furthermore, the involvement for producing a radiating element in accordance with the invention is reduced in comparison with the prior art, since it is possible to dispense with corresponding elaborate geometric structures for the radiating element. When producing or using a radiating element having an almost exact shaping as a cylinder or as a hollow cylinder without correspondingly complex geometric patterns, the production involvement and hence the production costs are reduced in comparison with the previous prior art.

In general, an apparatus in accordance with the invention can be used both as a single-stage and as a multi-stage operating status warning lamp apparatus. By way of example, a single radiating element or a physical unit is used as radiating element in accordance with the invention; this may be expedient for a single-stage or else a multistage apparatus or signal column or the like, for example. Preferably, the operating status warning lamp apparatus is in the form of a signal column having at least three warning lamp units and/or three separately shinable warning lamp decoupling areas and/or radiating elements.

A multistage apparatus or signal column can advantageously be designed as a permanently preconfigured apparatus in accordance with the invention. Preferably, the apparatus/signal column has detachably connectable and/or optically connectable warning lamp units that forward the warning light. By way of example, plate-like radiating elements or else prism-like or cylindrical or else hollow cylindrical radiating elements can thus be designed to be advantageously connectable to one another and detachable again, so that it is possible to produce a modular design for a multistage apparatus in accordance with the invention without great involvement.

In principle, in the case of multistage embodiments of the invention, it is entirely also possible to produce a variant in which at least one lamp element/LED or LED group module is provided for each module. Accordingly, this variant embodiment also has provision for a power supply or information data line for each module or for the warning lamp element or for the LED/LED group.

Unlike in the prior art, however, in which not only the power supply for the individual modules or printed circuit boards but also a separate information data line had to be forwarded from module to module or provided in detachably connectable form, the present invention by contrast also allows the implementation of an advantageous variant of the modularity, wherein not electric power but rather visual, visible light is forwarded from module to module. That is to say that a module is in the form of an optical fiber. In this case, the respective warning light is decoupled in a stipulated/prescribed manner for each warning lamp unit.

Accordingly, optomechanical coupling or optomechanical connection is advantageously provided between advantageous warning lamp units or radiating elements, which allows the production of a multistage warning lamp column in accordance with the invention. That is to say that electrical connecting lines or the like between the individual warning lamp units or radiating elements can be dispensed with, which significantly reduces the involvement in terms of design and cost.

Advantageously, a (common) base module (for example in the form of a base and/or in the form of a cap) for two or more warning lamp units or radiating elements is provided that has at least the warning lamp element(s) or LED or LED groups for the various warning lamp units and/or a common electronic control unit. By way of example, an advantageous base module may have red, yellow and green LEDs that are each separately actuated or operated in a particular mode of operation. Advantageous light guidance to the respective module or from module to module allows the advantageous implementation of separate decoupling or decoupling at prescribed warning lamp radiating areas.

Alternatively or in combination therewith, a multistage or multicolored signal column can also be produced when using RGB LEDs, wherein the RGB LEDs generate different colors and decouple them at prescribed areas in accordance with the invention. By way of example, in RGB LED variants, a common radiating area is provided for a plurality of different colors or units or else for different, separate radiating areas.

Preferably, at least three radiating elements are arranged in succession or next to one another as a layer structure in the direction of the warning light decoupling. By way of example, separate warning colors or warning lights are provided for each layer, so that differently colored warning lights for each layer are decoupled in accordance with the invention. By way of example, a plurality of or all layers in the layer structure decouple almost in the same direction or directions. As result of the layer structure, for example in the case of a multilayer plate design, with the observer looking at the front area, the observer does not see the layer structure, at least at first glance, but instead, only when a radiating element is switched on or in operation, sees that the apparatus in accordance with the invention can decouple different warning light colors. Thus, the radiating element is transparent, for example, while during normal operation of the technical appliance to be monitored a first layer is green and during faulty operation of the technical appliance to be monitored a second layer or the second radiating element the inventive apparatus appears or shines red.

In one particular development of the invention, at least two, preferably three, radiating elements are arranged concentrically with respect to one another. By way of example, a cylindrical radiating element is arranged centrally or at the center and has at least one hollow cylindrical radiating element or a plurality of hollow cylindrical concentric radiating elements arranged concentrically about it. This produces a three-dimensional or concentric layer structure. Accordingly, the radiating elements in accordance with the invention each have a circular or circular ring shaped cross section/end face on which the warning lamp elements are arranged. However, square, rectangular or polygonal, for example hexagonal/octagonal, cross sectional areas or rings/traverses are also conceivable.

In the case of the aforementioned concentric variant embodiments too, the warning lamp elements in accordance with the invention are arranged at the end and advantageously couple the warning light into the respective radiating element in or essentially parallel to the direction of the center axis or longitudinal axis. The advantageous scattering means or scattering bodies and/or diffuser areas on the outer area of the radiating elements and/or inside the radiating elements advantageously deflect the warning light such that said radiating elements decouple on the (hollow) cylinder lateral faces or on the lateral faces essentially transversely with respect to the center axis or longitudinal axis and are perceived by the observer. Even in the case of all-round lights, that is to say that the warning light is decoupled essentially over the full periphery 360° about the center axis, this results in new and particularly advantageous options for the arrangement of a plurality of warning lamp elements, in particular with regard to the arrangement thereof at/on the cross-sectional area or at the inventive end face. Accordingly, the involvement in terms of design and therefore also cost for implementing appropriate multidimensional apparatuses or signal columns is reduced.

Advantageously, the radiating element has at least one diffuser or a diffuser element or a diffuser layer, which means that the warning light decoupling can be implemented with particularly homogeneous distribution.

This diffusion or homogenization of the warning light can be provided both on the outer area or at the radiating area and inside the radiating element.

BRIEF DESCRIPTION OF THE SEVERAL VIEWS OF THE DRAWINGS

An exemplary embodiment of the invention is shown in the drawing and is explained in more detail with reference to the figures, in which, specifically.

DETAILED DESCRIPTION OF THE INVENTION AND BEST MODE

Figure 1:
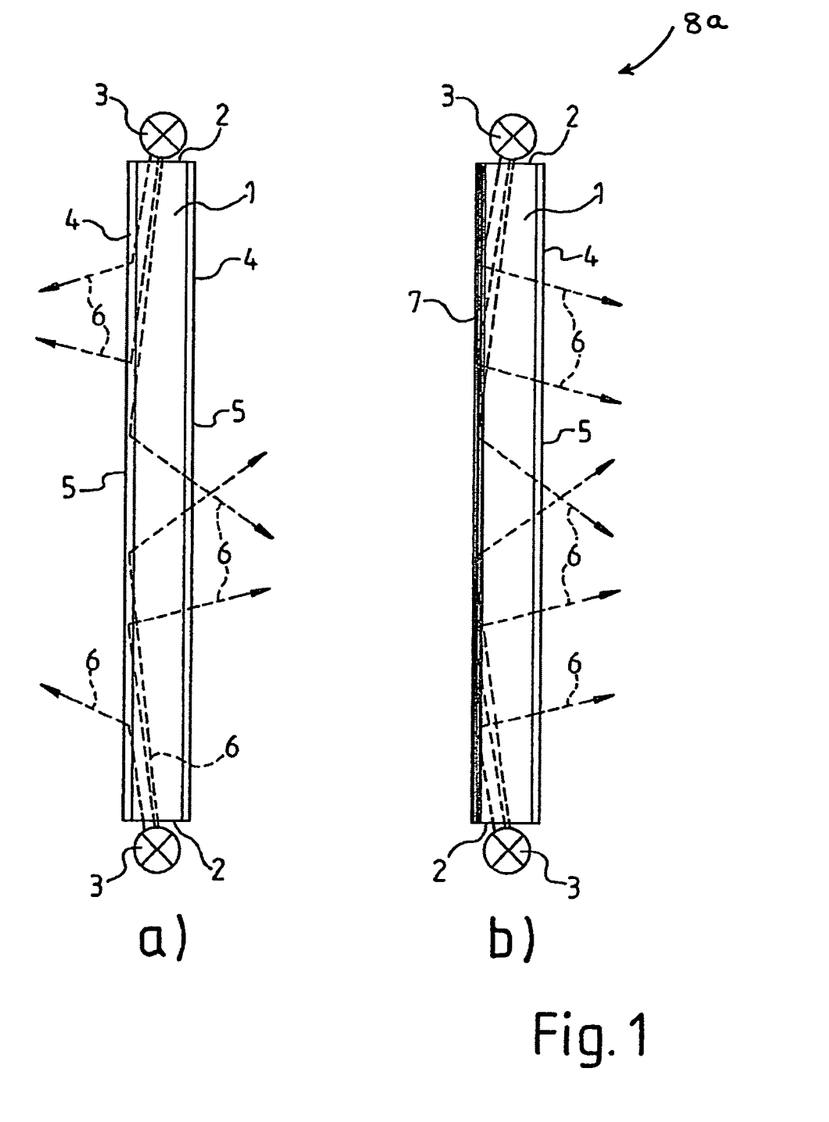
FIG. 1 shows a schematic section from an inventive apparatus having a plate shape.
Figure 2:
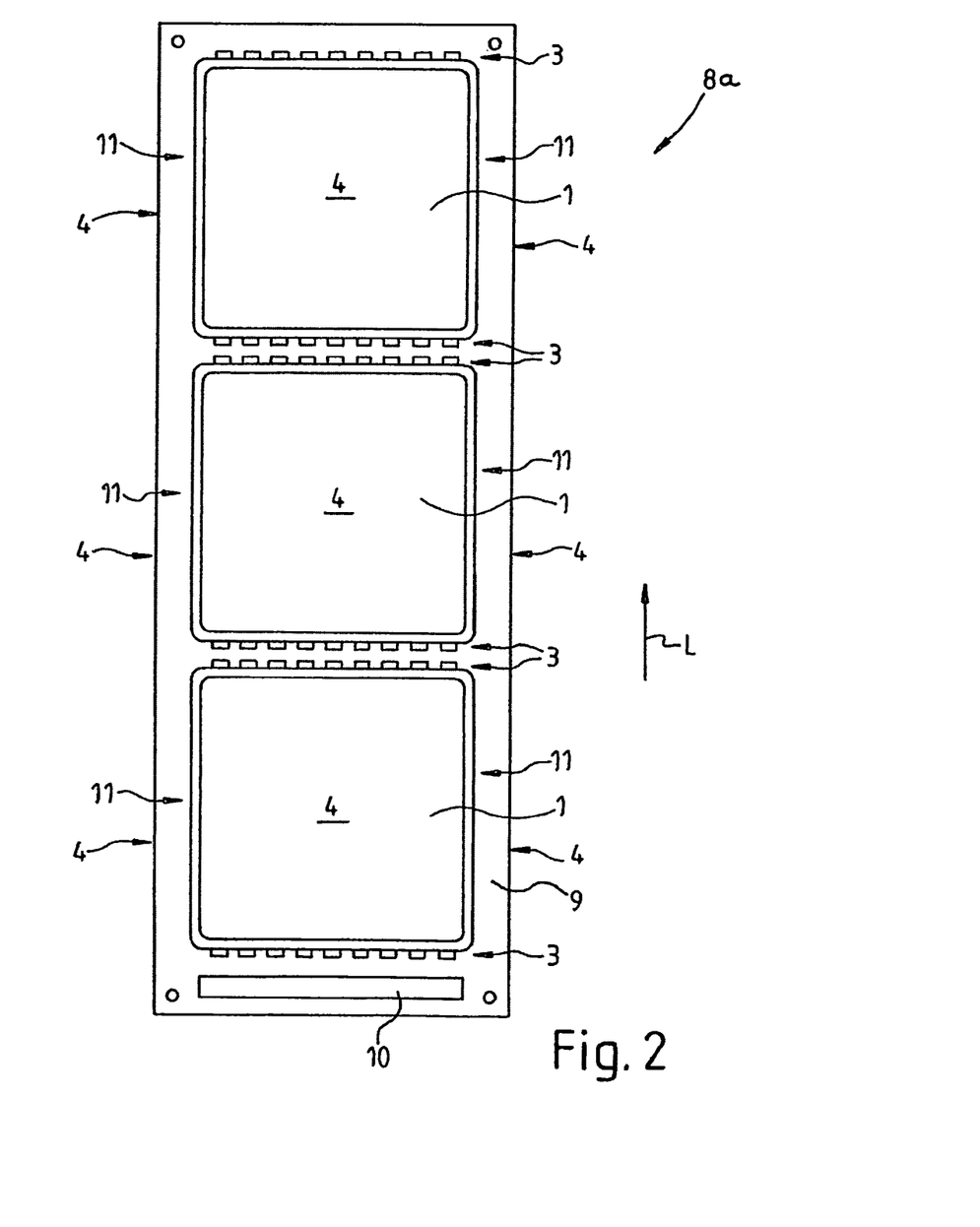
FIG. 2 shows a schematic view of a permanently preconfigured three-stage, plate-like apparatus in accordance with the invention.

FIG. 1 shows a column 8 which can be a plate like embodiment 8a or the cylindrical embodiments of FIG. 4a-d which are variants collectively referred to as apparatuses 8 in accordance with the invention in which FIGS. 1 and 2 illustrate a plate-like radiating element 1. In this case, the radiating element 1 is in the form of a planar plate having two opposite ends 2 in accordance with the invention, at each of which at least one warning lamp element or an LED 3 is arranged.

In general, it is advantageous for the radiating elements 1 to be produced from plastic, particularly from transparent plastic.

In a variant shown in FIG. 1a, two opposite radiating areas 4 have a respective diffuser layer 5 arranged on them as scattering means in accordance with the invention, so that visual light 6 radiated in by the LEDs 3 impinges on said diffuser layer at an acute angle and is deflected by the diffuser layer or the diffuser area 5, so that the visible light 6 decouples on the two opposite radiating areas 4. As result of the deflection at the diffuser or at the diffuser layer 5, the light 6 is decoupled and is not reflected back again by corresponding total reflection.

FIG. 1b shows a second variant, one side of the radiating element 1 having a reflector 7 or a reflector area/layer 7 provided on it and the side opposite this having the radiating area 4 a diffuser 5 is in turn arranged on it. In the case of this variant, the reflector 7 reflects the light 6 back again on its side of the radiating element 1, and hence this light is guided completely through the radiating element 1, so that this is decoupled the warning light 6 exclusively on the opposite side or on the radiating area 4 and is advantageously scattered by the diffuser 5, inter alia, so that an almost homogeneous appearance is obtained.

FIG. 2 schematically shows a three-stage apparatus in accordance with the invention or a three-stage signal column 8a, with LEDs 3 being provided in turn. The numerous LEDs 3 arranged on a straight line radiate warning light in longitudinal direction L or contrary to this direction, the warning light in accordance with the invention coupling into the end 2 of the respective radiating element 1 and advantageously emerging/decoupling at the radiating areas 4.

The signal column 8a advantageously has a frame 9 or a frame element 9 that is designed to hold all three stages or all three radiating elements 1 or radiating areas 4. Thus, the signal column 8a has a multilayer design, with an aluminum core printed circuit board, for example, being provided to form an underside of the frame 9. This aluminum core printed circuit board is preferably produced essentially from aluminum, on which, by way of example, an electrical insulating layer is arranged and thereon, in turn, a copper conductor track is arranged. The copper conductor track has the LEDs 3, including further advantageous electronic components, arranged on it, so that the aluminum core printed circuit board is also designed to dissipate the heat from the LEDs 3 firstly electrical printed circuit board and secondly by virtue of the advantageous metal/aluminum layer.

At the same time, the aluminum core printed circuit board is provided as a portable frame element at the frame 9. Furthermore, the aluminum core printed circuit board carries or holds advantageous radiating elements 1 in a layer situated above, that is to say that they are held by means of a further frame layer or a cover element of the frame 9 or a cover frame element. By way of example, the cover element may also consist of metal such as aluminum, so that both the underside and the top of the frame 9 appear uniform to the observer and advantageous heat dissipation is produced by the frame 9.

In addition, the frame or the aluminum core printed circuit board advantageously carries a control unit 10 that is designed to actuate the LEDs 3 or the three different stages. By way of example, the signal column 8a has the three different warning lamp colors red, yellow and green.

In the variant shown in FIG. 2, the frame 9 may also have recesses or slots 11, for example, on the right-hand and/or left-hand side in FIG. 2, so that a radiating area 4 in accordance with the invention can be produced not only at the front and/or rear but also to the right and left. This means that in the case of the illustrated exemplary embodiment shown in FIG. 2, the LEDs 3 couple light into the radiating element 1 at the end and that not only is warning light deflected on the large radiating area 4 by means of advantageous scattering means, warning light is also decoupled at the two ends, at which no LEDs 3 are arranged, and hence these are also implemented as radiating areas 4.

The depicted variant shown in FIG. 2 is a permanently prefabricated signal column 8a. However, it is also possible for a modular signal column 8a having corresponding plate-like radiating elements 1 to be produced, with the individual stages or warning lamp units advantageously being able to be assembled in detachably interconnectable fashion and detached again. In the case of a corresponding modular signal column 8, it is advantageous to provide an electronic unit or control unit 10 or the like in a separate control module that is designed to actuate or operate the respective individual warning lamp modules or radiating elements 1. By way of example, the effect that can be achieved by common mechanical and/or electrical and/or optical connecting points is that both the power supply and the information data transmission are implemented when two modules are assembled.

Figures 3, 4:
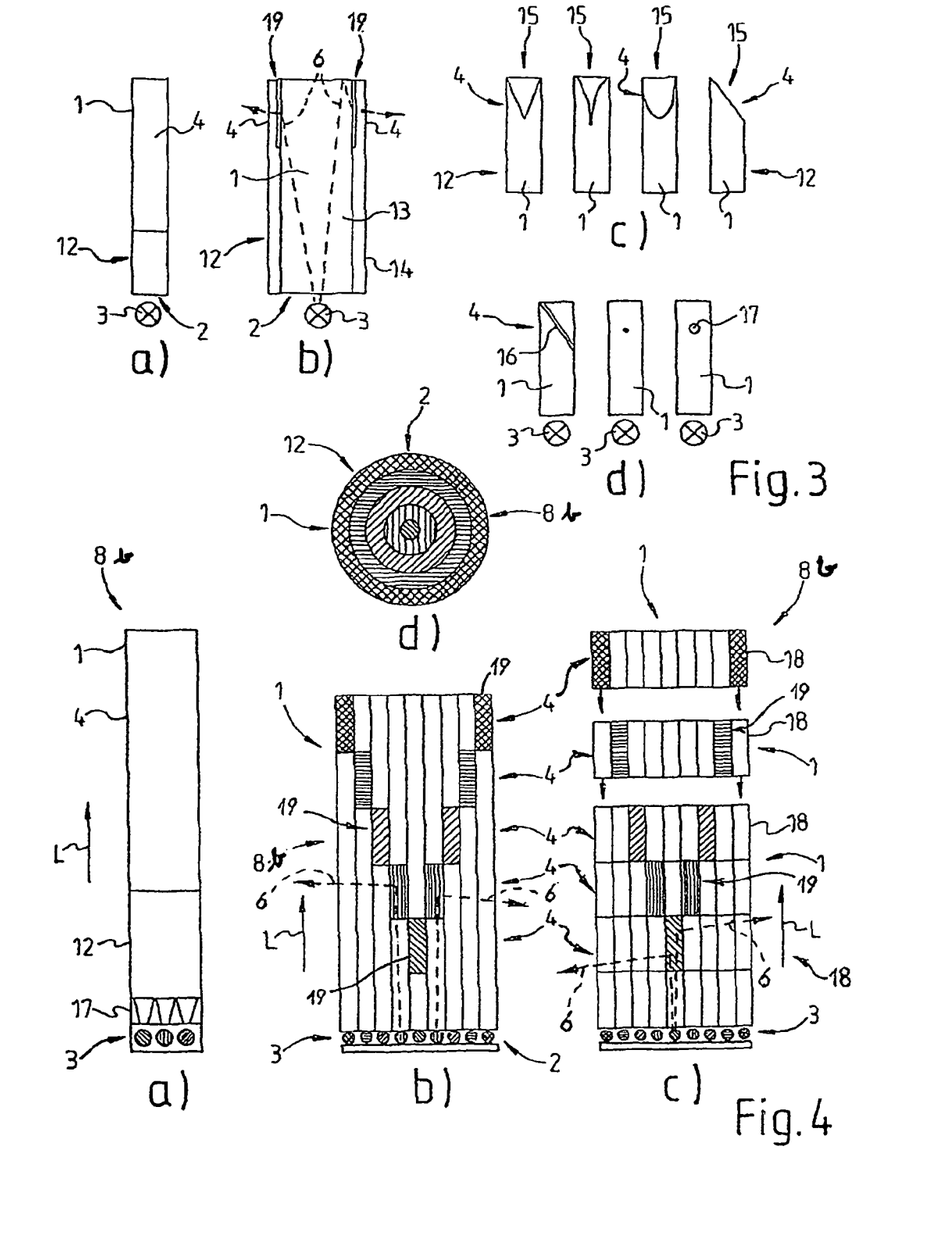
FIG. 3 shows a plurality of schematic, sectionally presented variants of possible forms/arrangements of scattering means in the/at radiating element(s)
FIG. 4 shows a plurality of schematic, sectionally presented variants of bar-like or cylindrical apparatuses in accordance with the invention.

FIG. 3 shows various options for the deflection or radiation. In this case, the radiating elements 1 may be either plate-like or cylindrical, parallelepipedal or other multidimensionally formed shapes. FIG. 3a is intended to illustrate a variant, wherein the scattering means are provided as a diffuser area 4 or radiating area 4 that is both roughened and coated, and hence the relevant diffuser area 4 or radiating area 4 is arranged on the outer surface or outside. Furthermore, FIG. 3a is provided with a section 12 that has a polished surface, for example, so that in this case the light coupled in from the LED 3 remains inside the radiating element 1 on account of the total reflection implemented here or is forwarded to the area 4 by this section 12 and is decoupled only there.

In the case of the variant shown in FIG. 3a, it is also possible for the region with the radiating area 4 to consist of a plastic material, for example, that has scattering particles or scattering bodies inside, so that the relevant light from the LED 3 is deflected and decoupled. By way of example, the material used may be the radiating element Plexiglas, which comprises no scattering particles in the section 12 and, in the region of the area 4, has advantageous scattering particles that are in a homogeneously distributed arrangement inside the Plexiglas or the like, for example. This also produces a homogeneous appearance for the radiating area 4 or apparatus in accordance with the invention.

FIG. 3b shows a variant, wherein a section or a region 19 is in the form of a roughened or coated inside/inner area. Thus, the region 19 is in the form of an inner layer or structure 19 that deflects the warning light 6 (merely indicated in FIG. 3b) as appropriate and deflects it outwardly to the radiating area 4.

By way of example, the roughening or coating can be implemented by virtue of the radiating element 1 being produced in two portions, with an inner portion and an outer portion 14, which is of hollow cylindrical design, being sandblasted, subjected to acid etching or having a diffuser layer applied in a defined subarea. The radiating element 1 can also be produced as an injection molded portion. First experiments have shown that a (somewhat) rough surface of an injection molding tool generates a diffuser surface, which can advantageously scatter or deflect the warning light 6. This is a particularly low-cost variant in accordance with the invention.

FIG. 3c depicts several variants, with differently shaped recesses or cutouts 15 being used to produce a deflection for the warning light in accordance with the invention, so that the radiating area 4 is produced in the region of the cutout 15.

In addition, FIG. 3d shows different variants of the invention, with inner reflection areas being used, for example by means of laser handling, that is to say by virtue of thermal alterations within the radiating element 1, to produce reflection or scattering of the warning light in accordance with the invention. Thus, variants in FIG. 3d are shown by way of example, with an inner oblique area 16 being generated, at which the warning light is scattered or deflected as appropriate, so that the radiating area 4 in accordance with the invention is generated in this region at the side. It is also possible to generate point-like inner scattering areas or scattering sections 17 that deflect the relevant warning light at the side and decouple it as appropriate in accordance with the invention.

FIG. 4 shows different variant embodiments with a cylindrically formed luminous body or a cylindrical signal column 8b in accordance with the invention. FIG. 4a shows a single-stage signal column 8b, but with the radiating element 1 having a radiating area 4 and, in turn, a section 12 being arranged between the radiating area 4 and the LEDs 3. The section 12 in turn has a polished surface and forwards the light.

Furthermore, in this variant, an upstream optical system 17 or a lens system 17 or the like is provided that can advantageously be used to guide or route the warning light 6 (merely indicated in FIGS. 4b and 4c) generated by the LEDs 3 and to couple it into the end in accordance with the invention, as a result of which the coupling into the radiating element 1 is improved.

The variants shown in FIGS. 4b and 4c each show a multistage signal column 8b that has concentric layers (cf. FIG. 4d), each layer or each ring having a common warning lamp color, for example. By way of example, LEDs 3 in the same color are arranged at the end in a ring, as result of which said LEDs—according to the schematic plan view in FIG. 4d—couple a common warning lamp color (shown merely as indicated warning light 6 in FIGS. 4b and 4c) into the radiating element 1 for each circular ring, and the corresponding warning light 6 decouples at different sections or areas 4 by virtue of advantageous deflection or scattering inside the ring or the layer/structure 19.

This assigns a respective defined radiating area 4 to each warning lamp color. That is to say that different radiating areas 4 are provided in the longitudinal direction L that are each provided for the purpose of decoupling differently colored light 6. In the case of the variant shown in FIG. 4b, a preconfigured multistage signal column 8b is presented, the warning lamp units of which are in the form of a single physical unit/element.

By contrast, FIG. 4c schematically shows a multistage signal column 8b of correspondingly modular design. In this case, the individual modules 18 can be mechanically connected and, in the connected state, also optically coupled to one another without further illustration, as result of which the light guide from one module 18 to an adjacent module 18 is optically coupled or connected.

In both variants shown in FIGS. 4b and 4c, a prescribed or defined relationship between the respective layer and the respective arrangement of the radiating area 4 in the longitudinal direction L is implemented. This means that the transverse arrangement of the LEDs 3 at the ends is prescribed on the basis of or defined with the longitudinal arrangement/extent of the radiating areas 4 using the scattering means in accordance with the invention.

Furthermore, without further illustration, it is also possible to provide a layer, for example, that shines red during operation, for example, and does not just extend via a single subsection or a single module 18 in the longitudinal direction but also extends—in the case of the variants in FIGS. 4b and 4c—via a plurality of modules 18 or even essentially over the entire length of the signal column 8, i.e. over the entire length of the respective luminous bodies or of the common physical unit or of all modules 18. A chase mode for the LEDs arranged in a ring may also be advantageous for the signaling.

In general, the present invention can be used to produce an operating status warning lamp apparatus that is not just able to be produced with a plate-like or tile-like design (cf. FIGS. 1 and 2); instead, it is also possible to produce novel cylindrical signal columns 8 in accordance with the variants in FIG. 4 as a warning lamp bar or the like. In the switched-off state, this warning lamp bar can be designed to be (slightly) opaque or cloudy or completely or almost completely transparent, so that it is very plain or inconspicuous.

The production of appropriate plate-like radiating elements 1 as shown in FIGS. 1 and 2 or cylindrical radiating elements 1 as shown in FIG. 4a or hollow cylindrical, mutually concentrically arranged hollow cylinder layers as per the variants in FIGS. 4b, 4c and 4d can be produced at significantly lower cost in comparison with conventional complex spherical caps.

In general, an apparatus in accordance with the invention can also be (wirelessly) connected or operated to/with other or numerous other apparatuses in an advantageous electronic signaling appliance network with one another.

In general, preferably one or more LEDs or the like, but also at least one laser, can be provided for a warning lamp unit 1, 4 or a module 18 as light source/light sources in order to produce visible warning light 6 or laser light.

LIST OF REFERENCE SYMBOLS

1 Radiating element
2 End
3 LED
4 Radiating area
5 Diffuser
6 Light
7 Reflector
8 Signal column
9 Frame
10 Control unit
11 End
12 Section
13 Portion
14 Portion
15 Cutout
16 Area
17 Optical system/lens
18 Module
19 Structure
L Longitudinal direction

What is claimed is:
1. A warning light device comprising:
(a) a hollow modular warning light radiating element having a first end face, a second end face and a radiating area disposed substantially transverse to the first end face and the second end face and extending substantially the entire length between the first end face and the second end face wherein the first end face and the second end face are mechanically and optically detachable and connectable to form a hollow modular warning light column capable of forwarding data between modules of a modular warning light column formed by a combination of more than one warning light radiating element;

(b) at least one warning light disposed on the first end face or the second end face of the hollow modular warning light element;

(c) a diffuser disposed on one side both sides or around the hollow warning light radiating element and having light scattering particles disposed on an inside surface, an outside surface or between the inside surface and outside surface in the hollow modular warning light radiating element to provide a radiating area with a milky or cloudy radiating appearance and reflect light from one side both sides or around the hollow modular warning light element; and (d) a data link to a technical device to provide the data on an operating status of the technical device between modules through the first end face or the second end face of the hollow modular warning light column and display the data in at least one hollow modular warning light radiating element in a hollow modular light column.

2. The warning light device of claim 1 further comprising a reflector layer disposed substantially transverse to the diffuser.

3. The warning light device of claim 1 wherein the light scattering particles have a diameter smaller than the wavelength of visible light.

4. The warning light device of claim 1 further comprising a plurality of hollow modular warning light elements with each warning light element having an optomechanical coupling or connector and the modular hollow warning light column is interconnected concentrically.

5. The warning light device of claim 1 wherein the diffuser includes patterns, symbols, letters or text.

6. An apparatus to warn of the operating status of a machine comprising;
(a) a hollow optically connectable modular warning lamp housing having at least one end face and a radiating area disposed substantially transverse to the at least one end face;
(b) at least one warning light element disposed in the at least one end face to visually indicate at least one operating status of the machine or a plurality of operating statuses of the machine;
(c) a diffuser layer composed of light scattering particles disposed on an inside surface an outside surface or between the inside surface and outside surface of the hollow optically connectable modular warning lamp housing to provide a radiating area on one side or around the hollow optically connectable modular warning lamp housing, said light scattering particles in the diffuser layer having a diameter smaller than the wavelength of visible light to provide a cloudy appearing radiating area;
(d) a common optomechanical coupling or connector disposed on the at least one end face of the optically connectable modular warning lamp housing to connect a plurality of warning light elements into an optically connectable hollow modular light column and pass data through one or more end face to a succeeding hollow optically connectable modular warning lamp housing; and
(e) a data link to the at least one operating status or a plurality of operating statuses of the machine to provide data on the operating status or the plurality of operating statuses of the machine wherein the data is forwarded as light between modules of the hollow modular warning light column through the at least one end face and displayed in at least one warning light element in the hollow modular light column.

7. The apparatus of claim 6 further comprising a common control unit.

8. An operating status warning light apparatus for the optical display of at least one operating status or of several different operating statuses of a technical device with at least one warning light unit (1, 4), wherein the warning light unit (1, 4) has at least one warning light element (3) for generating warning light (6), wherein the warning light unit (1, 4) has an emission element (1) having at least one warning light-emission surface (4) for the emission of the warning light (6), wherein the emission element (1) has at least one front side surface (2) aligned transversely to the warning light-emission surface (4), wherein the warning light element (3) is arranged on the front side surface (2) for coupling the warning light (6) into the emission element (1) and the emission element (1) has diffusion means (5, 15, 19) for diffusion of the warning light (6), so that the warning light (6) enters via the front side surface (2) into the emission element (1) and is deflected to the warning light-emission surface (4), wherein the operating status warning light device is a modular and multi-stage device to interconnect and form a signal column with emission elements (1), characterized in that the diffusion means (5, 15, 19) are designed as diffusion bodies (17) and/or diffusion particles (17) arranged on and/or within the emission element (1), and the emission elements (1) can be combined with each other and can be detachably and interchangeably reconfigured, so that the modular structure of the modular and multi-stage signal column can display the at least one operating status or several different operating statuses of the technical device through an information data line provided for each module (18).

9. The apparatus according to claim 8 further comprising an end face (2) wherein the end face is smaller than the warning light-emission surface (4).

10. The apparatus according to claim 8 wherein the diffusion means and warning light-emission surface (4) extends from the inside surface to the outside surface of the radiating element.

11. The apparatus according to claim 8 wherein the diffusion particles of the diffusion means (5, 15, 19) are disposed on the inside and an outside surface of the radiating element.

12. The apparatus according to claim 8 wherein the operating status warning lamp is a signal column having at least three warning light units (1, 4) with a decoupling member.

13. The apparatus according to claim 12 wherein the signal column with status warning light has detachably connectable and optically connectable warning lamp units (18).

14. The apparatus according to claim 8 wherein three warning light units are arranged in succession or next to one another as a layer structure.

15. The apparatus according to claim 8 wherein at least three warning light units are arranged concentrically with respect to one another.

16. The apparatus according to claim 8 wherein the warning light element (3) is a laser element (3) to produce laser light (6).

17. The apparatus according to claim 8 wherein the warning light element is an RGB LED.

18. The apparatus according to claim 8 further comprising a second end face and a second warning lamp element disposed on the second end face.

* * * * *